United States Patent [19]

Berweger

[11] Patent Number: 4,494,676
[45] Date of Patent: Jan. 22, 1985

[54] MULTI-COMPONENT DELIVERY APPARATUS

[76] Inventor: Manfred Berweger, 17, Hortensiadreef, B 2180 Kalmthout, Belgium

[21] Appl. No.: 283,560

[22] Filed: Jul. 15, 1981

[30] Foreign Application Priority Data

Aug. 4, 1980 [DE] Fed. Rep. of Germany ....... 3029554

[51] Int. Cl.³ .............................................. B67D 5/08
[52] U.S. Cl. ..................................... 222/63; 222/135; 417/429
[58] Field of Search ................... 222/145, 135, 62, 63, 222/249, 250, 334; 417/426, 429; 91/364; 137/99, 98

[56] References Cited

U.S. PATENT DOCUMENTS

| 3,889,850 | 6/1975 | Whitt | 222/135 |
| 3,908,862 | 9/1975 | Chandra et al. | 222/135 |
| 4,030,860 | 6/1977 | Standlick | 417/429 |
| 4,090,695 | 5/1978 | Stone et al. | 222/63 |
| 4,228,924 | 10/1980 | Gilbert | 222/63 |
| 4,269,327 | 5/1981 | Welch | 222/135 |
| 4,286,732 | 9/1981 | James et al. | 222/135 |
| 4,394,870 | 6/1983 | MacPhee et al. | 137/99 |

FOREIGN PATENT DOCUMENTS 2911443 6/1980 Fed. Rep. of Germany .

Primary Examiner—Joseph J. Rolla
Assistant Examiner—Kenneth Noland
Attorney, Agent, or Firm—Jerry Cohen; M. Lawrence Oliverio

[57] ABSTRACT

The apparatus consists of a plurality of piston pumps having preset displacement ratios. A motor mechanism is connected to each of the pumps. In addition, there is a control mechanism connected to each pump ensuring that all pistons execute their previous stroke completely before being reversed and that they all start their following stroke at exactly the same moment. Furthermore there is another control mechanism controlling the speed of each piston so that all pistons complete their respective strokes simultaneously. A mechanism for adjusting and varying the pump displacement is also provided.

7 Claims, 8 Drawing Figures

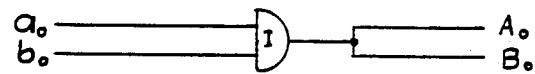
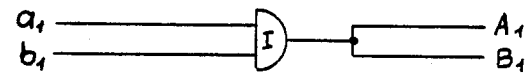
FIG 5
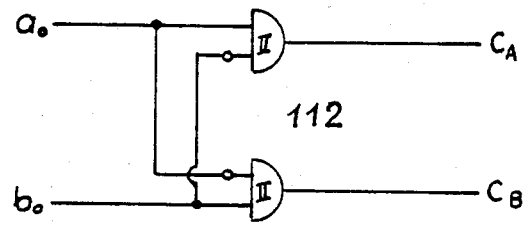
FIG 6
I = LOGIC FUNCTION "AND"
II = LOGIC FUNCTION "NOT"

MULTI-COMPONENT DELIVERY APPARATUS

BACKGROUND OF THE INVENTION

Multiple component delivery pumps are used when two or more materials have to be combined to obtain a desired product. In many instances the process has to ensure that the ratio between the components is maintained accurately and continuously. This is true for example when components of plastic materials are delivered which cure by chemical reaction. In some industries like the Painting industry where multi component plastic materials ae applied by airless spray an additional requirement is that the delivery takes place under high pressure. This limits the delivery pumps to the piston type.

Piston pumps can be assembled to a multi component delivery apparatus by connecting them mechanically and operating them from one power source or by controlling a number of independent units via their propelling medium each unit consisting of a piston pump directly connected to a piston motor.

Several methods are known to operate independent piston pump/piston motor units simultaneously.

One such apparatus (DE-OS 2646 606) uses the propelling medium in all motors in sequence thus ensuring that the strokes begin and end at the same time. The stroke length can be adjusted to a required ratio by using piston motors of different diameters but same volume or by attaching so called bypass cylinders.

Another apparatus controls the motor piston movements by the volumetric ratio of the propelling medium. An electronic control unit in connection with sensors permanently checks the position of each piston compares the positions with each other and with a preselected ratio and in case of differences corrects the supply or exhaust of the propelling medium via motor operated valves or it reverses the piston strokes when the pre-selected dead centres are reached.

In these two versions the method of central control leads to acceptable results with respect to continuous ratio accuracy and stroke adjustments when hydraulic propelling medium are used. Because of the compressibility of air these versions are not suited for air motors.

An apparatus operated by compressed air (GB 12 45 097) controls all motors via an air selector actuated by one of the motors only. The method is described as "master-slave-system". With a restrictor the air rate admitted to the master motor is kept at a lower value than that admitted to the slave motors with the intention of allowing the slave motors to finish their strokes before the master motor does. The stroke length can be adjusted mechanically to a required ratio by a stroke stop.

This version of central control does not exclude that one or more of the slave pumps have to wait at their dead centre before being reversed or that they do not completely finish their previous stroke. It therefore does not guarantee that a preset ratio is continuously maintained especially when the viscosity of the product changes during the delivery process. The method of stroke length modification applied creates a free cylinder space which has to be filled with propelling medium before the piston is actuated. It therefore leads to delayed stroke commencement and to pulsation. Other methods of stroke length modification known (DE-OS 29 11 443 and DE-OS 2212997) have the same disadvantage in principle: they lead to pulsation either due to a dead stroke or due to a free cylinder space.

SUMMARY OF THE INVENTION

In accordance with the invention, a multi-component delivery apparatus in which the volumetric ratios of the components are preset, includes a plurality of piston pumps having preset displacement values. In addition, motor means for each of said pumps is provided. The motor means are coupled to a control means which controls each piston in each pump so that they start and complete their respective strokes together. Means for delivering independent components to each of said pumps is provided. Measured amounts of the components leaving each of said pumps is then coupled to an in line mixing means.

Some of the objects of the invention are:
to provide a multi-component delivery apparatus which avoids the limitations and disadvantages of prior art devices.
to provide a multi-component delivery apparatus in which the volumetric ratios of the components being delivered may be adjusted with relative ease.
to provide a multi-component delivery apparatus which utilizes widely available off-the-shelf components.
to provide a multi-component delivery apparatus which may be broken down into independent and individual operating units.
to provide a multi-component delivery apparatus in which compressed air is the actuating and control medium.

These and other objects and features of the present invention will be more apparent from the following description of the specific embodiments which represent the best known uses of the invention.

DESCRIPTION OF THE DRAWINGS

FIG. 5 is a logic representation of one form of a synchronization circuit.

FIG. 6 is a logic representation of one form of a speed control circuit.

DESCRIPTION OF EMBODIMENT OF THE INVENTION

Figure 1:
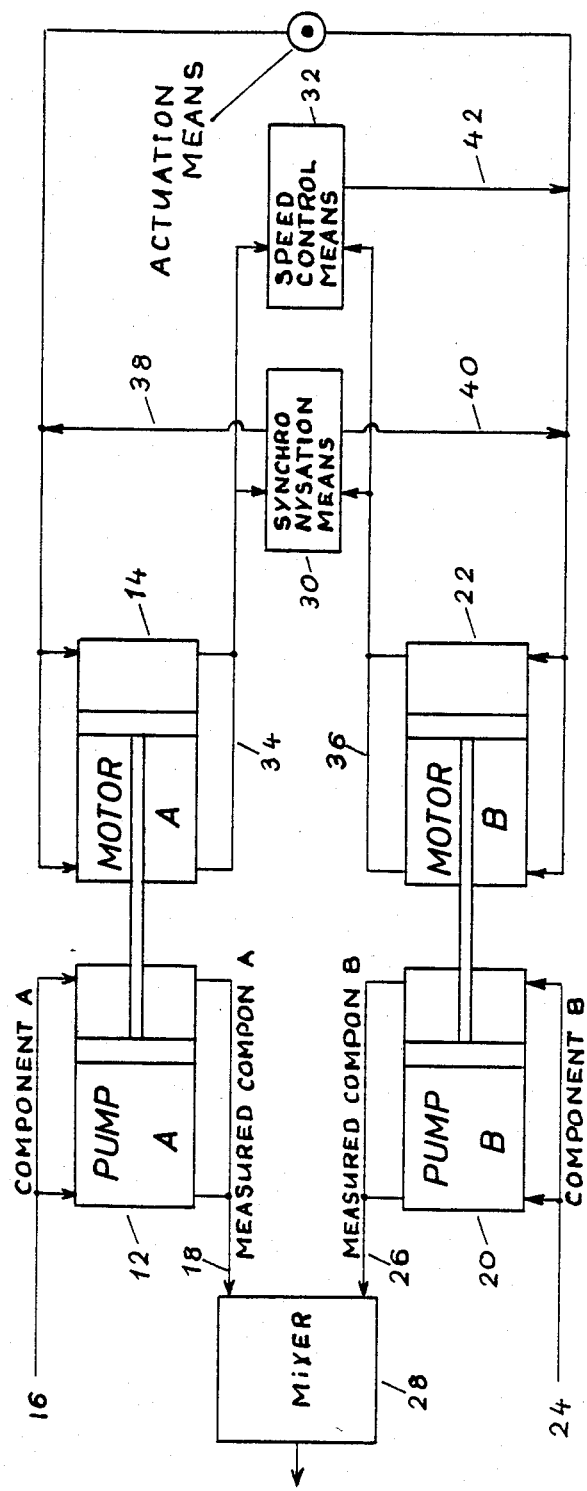
FIG. 1 is a block diagram depicting the multi-component delivery apparatus covered by the invention.

FIG. 1 of the drawing shows a block diagram of a multi-component delivery apparatus. Briefly, there is shown a piston pump 12 coupled to a motor 14, which is, for reasons that will become apparent, preferably a double-acting piston motor. A Component A is supplied to the piston pump at 16 and a measured amount of Component A leaves the piston pump at 18.

Component B is supplied to a second piston pump 20 which is, in turn, coupled to a motor 22. Component B enters the piston pump 20 at 24, and a measured amount of Component B leaves the piston pump at 26. Measured Components A and B are coupled respectively to an in line mixing apparatus 28.

The multi-component delivery apparatus also includes synchronization means 30 which is coupled to motor 14 by means of conduits 34 and 38 and to motor 22 by means of conduits 36 and 40. The purpose of the synchronizing means 30 is to ensure that each of the pistons in pumps 12 and 20 execute their previous stroke completely before being reversed and that they start their following stroke simultaneously.

The multi-component apparatus also includes a speed control means 32 coupled to motors 14 and 22 with conduit 34, 36 and 42. The purpose of the speed control means 32 is to control the speed of motor 22 relative to motor 14 so that the pistons in pumps 12 and 20 complete their respective stroke at the same time.

The desired volume ratio of the pumped components is set and maintained by (i) adjusting the stroke of the piston motors and thereby proportionally of the piston pumps according to the desired volume ratio; (ii) synchronizing the movement of the piston motors by the synchronizing means 30 so that all the pistons start their stroke at the same time; and (iii) by adjusting the speed of the motors with a speed control means 32 to ensure that all the pistons execute the adjusted strokes at the same time interval.

Figure 2:
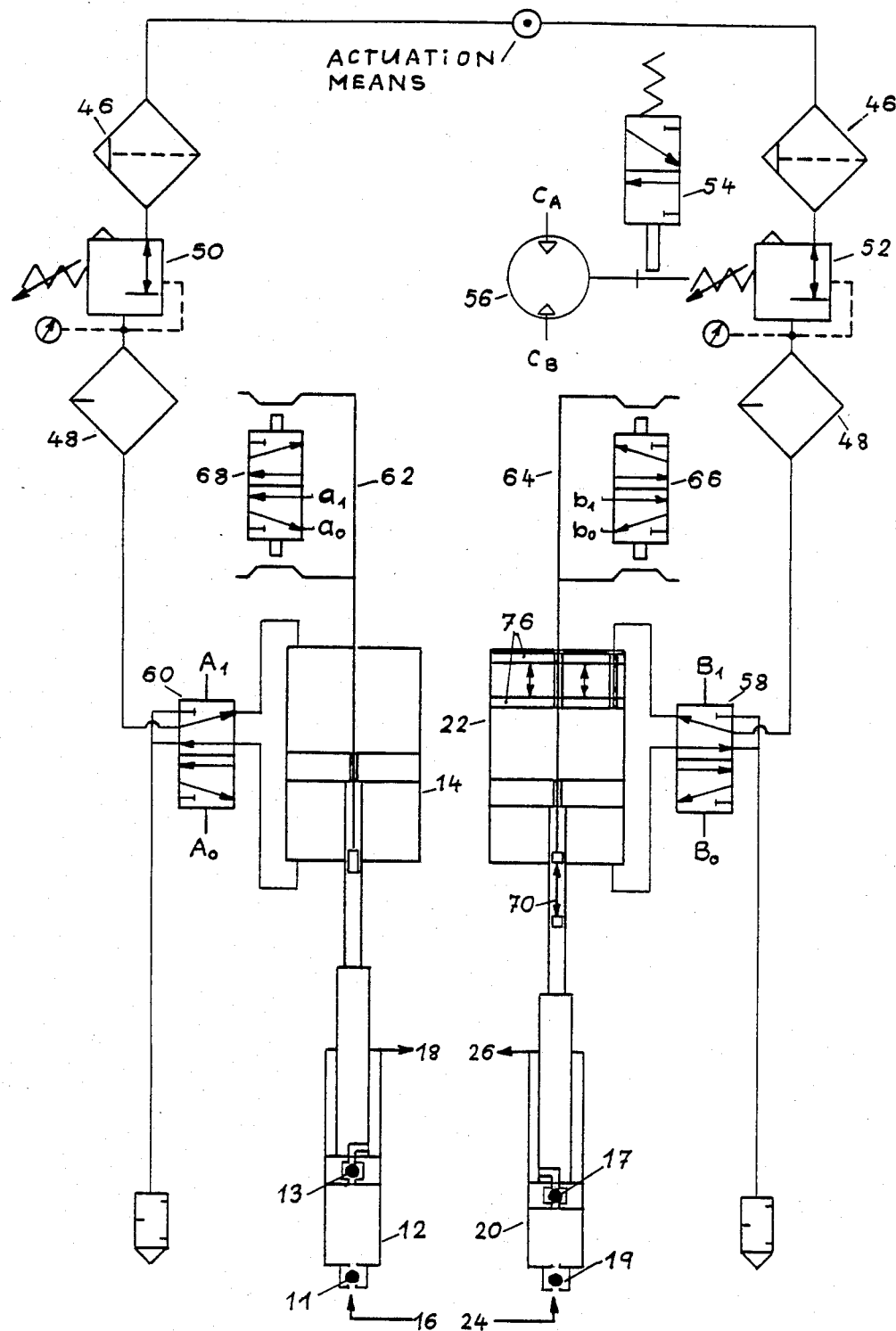
FIG. 2 is a schematic representation of a two-component delivery apparatus and associated control circuitry.

The specific way of achieving the previous three effects can be better understood by referring to FIG. 2 of the drawing. To the left of the section, there is shown a differential piston pump 12 which is coupled to a double-acting piston motor 14. The motor 14 contains a valve rod 62 which terminates outside of the motor 14 at signal control valve 68.

The signal control valve 68 via synchronization circuit 110 (FIG. 5) and conduits ao-Ao and ai-Ai is connected to the power control valve 60. Typically the valve rod 62 reverses the direction of the motor 14 at the end of each stroke. The pump 20, motor 22, their associated valve rod 64, their signal control valve 66 and their power control valve 58 are shown on the right side of FIG. 2.

When power control valves 58 and 60 are set at a position in which the actuation means act at the lower ends of the motors 14 and 22 the motor pistons move upwards. Consequently the pump pistons move upwards also and cause fluid to be drawn into the pumps 12 and 20. The inlet valves 11 and 19 are open and the transfer valves 13 and 17 are closed. As the motor pistons approach the upper part of the cylinders the valve rods 62 and 64 are forced upwards and actuate the signal control valves 66 and 68 thus causing signals to be transmitted to the synchronization unit 110 (FIG. 5) and from there to the power control valves 58 and 60 which are being reset. The actuation means now act at the upper end of the motors 14 and 22 and cause the pistons to move downwards. The inlet valves 11 and 19 are closed and the transfer valves 13 and 17 open. The fluids which had been drawn into the lower parts of the pumps 12 and 20 during the upward strokes now pass through the transfer valves 13 and 17 into the upper parts. Since 50% of the upper pump volumes are occupied by the piston rods (principle of the differential piston pump) only 50% of the fluids remain in the upper pump parts whilst the other 50% are forced into the fluid lines at 18 and 26. The 50% left in the upper pump parts are forced into the fluid lines at the following upward strokes.

The speed of motor 22 is varied relative to the speed of motor 14 by means of the servo motor 56 coupled to a pressure regulator 52. A position indicator switch 54 gives a signal when the pressure reaches to a certain preset value.

50 is a manually operated pressure regulator for motor 14, 46 and 48 are air filters and air lubricators respectively.

The volumetric ratio of Component A and Component B is adjusted by adjusting the stroke of pumps 12 and 20 by means of adjusting the stroke of motors 14 and 22. The procedure is illustrated relative to pump 20 and motor 22 in FIG. 3.

Figure 3:
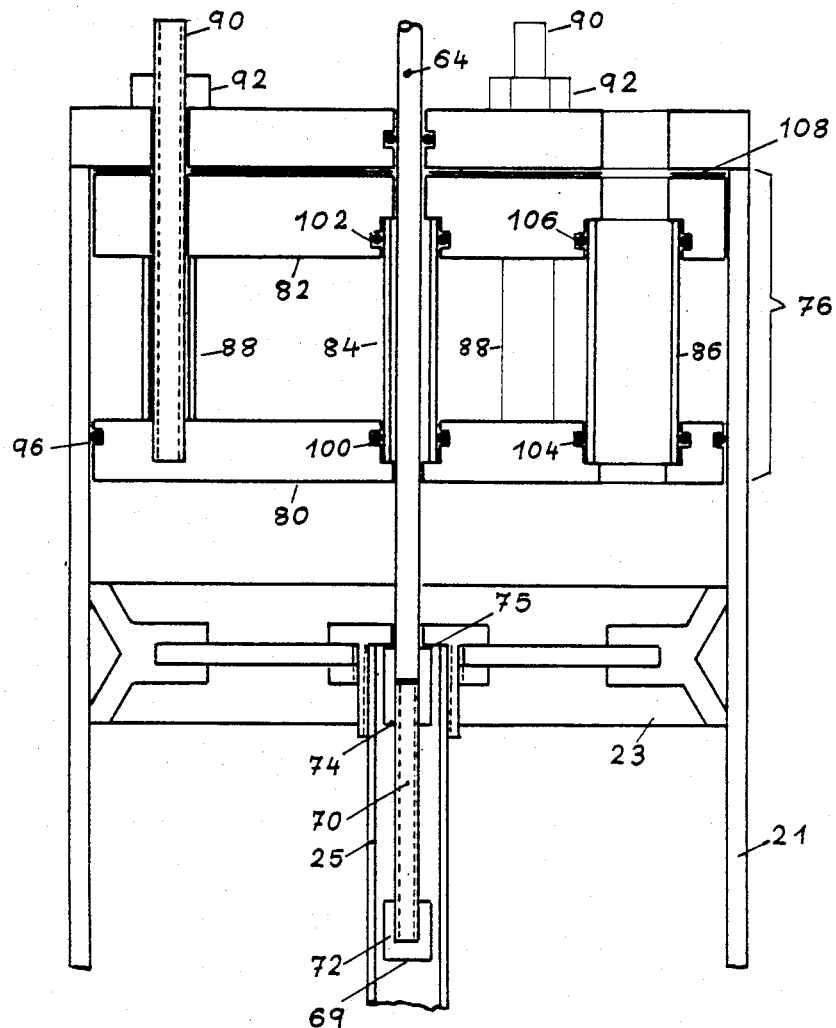
FIG. 3 is a sectional representation of a double-acting piston motor showing the means for adjusting the stroke of the piston at the upper end.

Referring to FIG. 3 there is added within the cylinder 21 of motor 22 a spacer 76. The spacer includes a lower plate 80, an upper plate 82 and pipes 88. The length of the pipes 88 defines the distance between the plates 80 and 82 and the height of the spacer 76 respectively. Pipe 84 is a conduit for the valve rod 64 and pipe 86 is a conduit for the actuation means. The conduit pipes 84 and 86 are sealed against the spacer plates 80 and 82 with O-rings 100, 102, 104 and 106. Spacer plate 80 is sealed against the cylinder 21 with O-ring 96 and spacer plate 82 is sealed against the cylinder head with gasket 108. With the threaded rods 90 and their corresponding nuts 92 the spacer is tightened to the cylinder head.

A spacer at the opposite end of the cylinder would be identical to the one shown in FIG. 3, with the understanding that the conduit 84 for the valve rod 64 in this case would be a conduit for the piston rod 25.

There is also shown in FIG. 3 a valve rod 64 with rod base 72 and 74 and their respective areas of contact 69 and 75. A threaded rod 70 is added between the rod bases 72 and 74.

Figure 4:
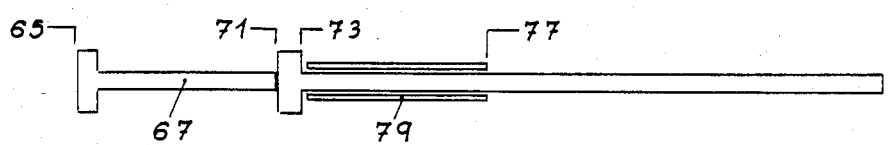
FIG. 4 is a schematic representation of a valve rod showing means to modify the actuating length.

FIG. 4 shows in more detail the specific way of adjusting the valve rod to a new stroke length. 71 and 73 are areas of contact on a conventional valve rod which are moved by the piston to reverse the stroke, 71 being actuated at one stroke end and 73 at the other end. Briefly, on the valve rod covered by the invention the area of contact 73 is transferred to a required position 77 by a member 79 and the area of contact 71 is transferred to a required position 65 by a member 67. It is obvious that the length of the threaded rod 70 shown in FIG. 3 has to be chosen in such a way that it moves the original area of contact designated 71 in FIG. 4 to its new position 65 by a distance which is equal to the height of the spacer 76.

In operation, as the piston 23 moves vertically upward, the piston rod 25 engages the valve rod 64 and carries the valve rod 64 upward. When the piston 23 comes to rest against the plate 80 the upward movement is terminated and the signal control valve gives a signal to the synchronization circuit 110 (FIG. 5) indicating that the piston movement may be reversed. Because of the added rod 70 the valve rod 64 will engage the signal control valve 66 (FIG. 2) by a length equivalent to the height of the spacer 76 sooner than it would have if the rod 70 were not added to the valve rod 64. In this way the upward strokes of pump 20 are cut short thereby reducing the volume displaced by the piston in the pump 20. Since the spacer is sealed against the cylinder 21 and against the conduit 84 for the valve rod 64 and against the air conduit 86 no propelling medium is lost in the spacer area and the reverse stroke begins without delay.

It is clear that the volume displaced by pump 20 may be adjusted simply by adding a spacer to the cylinder and that the stroke reversals at the adjusted stroke ends will be achieved by altering the valve rod. The principal advantage in operating this way is that two identical spraying units may be used in the two-component delivery apparatus illustrated in FIG. 2. It is also clear that the volumetric ratio displaced by the pumps 12 and 20 may be adjusted over a wide range in a relatively simple way.

The second feature of the invention is to ensure that the pistons in pump 12 and pump 20 execute their previous strokes completely before being reversed and that they start their following stroke at precisely the same time. One way of accomplishing this is by means of the synchronizing circuit 110 illustrated in FIG. 5. The letters A, B and a, b relate to identical letters in FIG. 2.

The synchronization circuit 110 gives an outgoing signal only if an incoming signal from signal control valve 68 as well as from signal control valve 66 is obtained, e.g., Ai and Bi are actuated at the same moment when an incoming signal from ai as well as from bi exists. Since the outgoing signals reset the power control valves 58 and 60 it is guaranteed that both motor pistons start their following stroke at exactly the same moment at both ends of their respective previous strokes.

As also previously pointed out a third feature of the invention was to control the speed of pumps 12 and 20 relative to one another so that their pistons complete a stroke at exactly the same time. This is accomplished by means of the speed control circuit 112 illustrated in FIG. 6.

The speed control circuit gives an outgoing signal at $C_A$ or $C_B$ when an incoming signal is only obtained from one signal control valve 66 or 68, e.g., an outgoing signal at $C_A$ is obtained as long as an incoming signal from $a_o$ exists and no incoming signal from $b_o$. The outgoing signal ceases as soon as incoming signals are obtained from both signal control valves. The outgoing signal may drive a servo motor 56 (or equivalent) which opens the pressure regulator 52 for motor 22 if the piston of motor 14 is faster (signal from $C_A$) and closes it if the piston of motor 22 is faster (signal from $C_B$).

When motor 22 needs more pressure than motor 14 situations may occur where the pressure supplied by the power source does not allow the required pressure increase. Therefore an adjustable position indicator switch is attached to pressure regulator 52. It gives a signal when a preselected pressure position is exceeded by the sero motor. In this case the pressure allowed to motor 14 has to be reduced with regulator 50.

Instead of connecting the outgoing signals of the speed control circuit 112 directly to a servo motor as described above the signals may also be used to correct a pressure regulator at motor 22 by hand.

It is obvious that the motor operated pressure regulator could be installed at motor 14 instead of motor 22. However, if more than two motors are connected to the speed control circuit one has to be designated as guide motor whilst the other ones are being considered as dependent motors. It is also obvious that instead of controlling the speeds of the piston motors with pressure regulators in the supply line of the actuation means the speed can also be controlled with throttle valves in the supply lines or the exhaust lines of the actuation means.

In general the speed control circuit 112 only has to obtain signals from the upper or from the lower dead centres of the motors since the main conditions influencing the piston speed are identical for both stroke directions if differential piston pumps in connection with double acting piston motors are used. However, if conditions require separate control for each one of the stroke directions this can also be achieved according to the invention simply by using separate pressure regulators with respective speed control circuits for each one of the directions.

The synchronization circuit 110 and the speed control circuit 112 are conventional, logic diagrams, and the various logic elements illustrated therein have been given their conventional designations. It is also clear that while this invention was described as utilizing fluidic control circuits, electronic control circuits performing the same function may be substituted for the fluidic circuits. The fluidic circuits, however, have the advantage of using, in this case, a readily available air supply system and pneumatic controls which are known to be very reliable.

Figure 7:
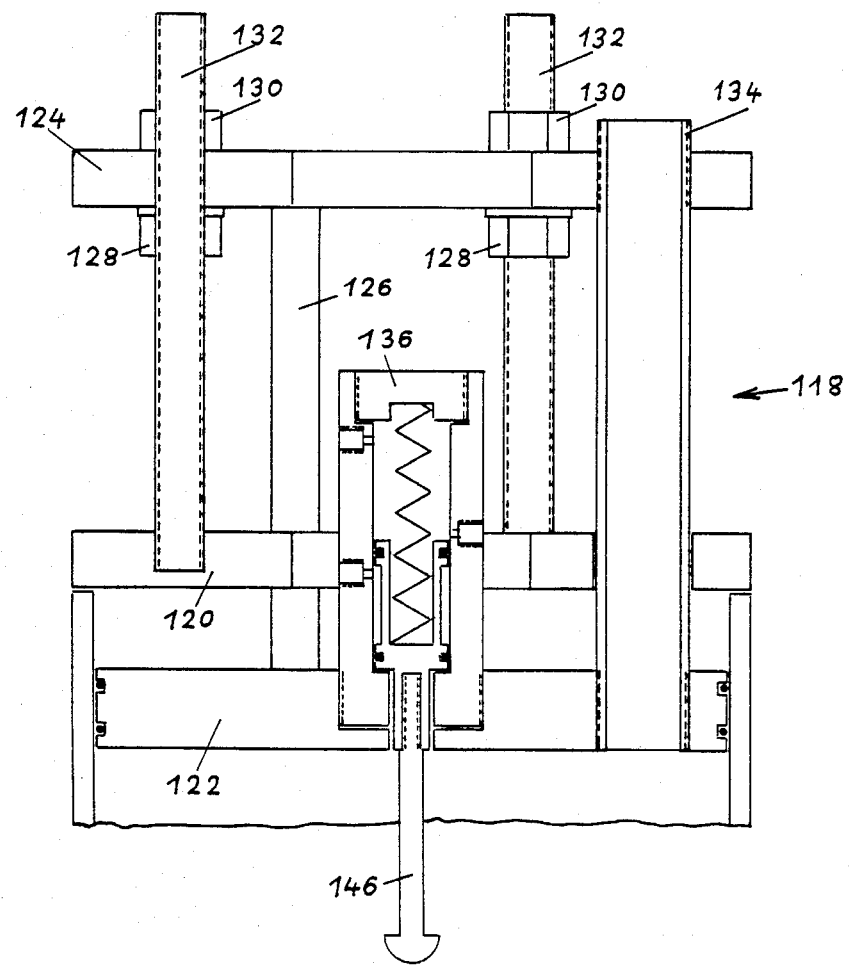
FIG. 7 shows means for adjusting the stroke of a piston motor from outside the motor.

FIG. 7 illustrates an alternative means for adjusting the stroke of a piston motor. In this case the adjustment can be made from outside the motor. The alternative adjustment means designated 118 includes a cylinder top plate 120, an adjustable cylinder head 122 and a signal control valve 136 with valve stem 146. The adjustable cylinder head 122 is connected to a support ring 124 through the members 126 and through the conduit 134 for the actuation means. By adjusting the bolts 128 and 130 on threaded members 132 the adjustable cylinder head 122 may be moved up and down the cylinder. Since the signal control valve 136 with its valve stem 146 is carried by the adjustable cylinder head it is moved together with the adjustable cylinder head thus emitting signals simultaneously at the new position indicating that the stroke has been terminated.

The signal valve design shown in FIG. 7 requires a second signal control valve on the other side of the motor. If this is not acceptable a variable valve rod as shown in FIG. 8 may be used.

Figure 8:
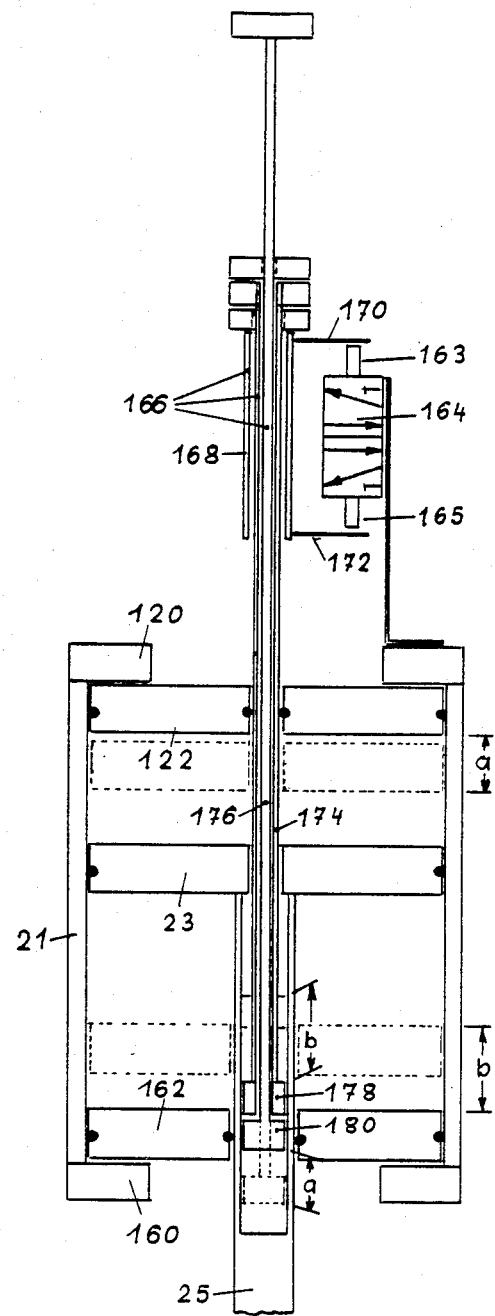
FIG. 8 shows a valve rod which can be adjusted to new stroke end positions from outside the motor.

Referring to FIG. 8 there is shown a motor cylinder 21 with piston 23 and piston rod 25 having an upper adjustable cylinder head 122 and a lower adjustable cylinder head 162. There is also shown a signal control valve 164 fastened to the upper open cylinder head with a bracket and a signal valve rod assembly 166. The signal valve rod assembly 166 consists of a guide pipe 168 with brackets 170 and 172, a push pipe 174 with pipe base 178 and a push rod 176 inside the push pipe 174 with rod base 180. The push rod 176 is adjustable relative to push pipe 174 with a thread as well as is push pipe 174 relative to guide pipe 168.

In operation, against the end of the downward stroke piston 23 through pipe base 178 moves the push pipe 174 with guide pipe 168 and bracket 170 downward thus pushing the valve stem 163 downward also and causing a signal from valve 164. Against the end of the upward stroke piston rod 25 at rod base 180 pushes the push rod 176 together with push pipe 174, guide pipe 168 and bracket 172 upward thus pushing the valve stem 165 upward also and causing a signal from valve 164.

If the lower adjustable cylinder head 162 is moved upward by the distance designated b in FIG. 8 a signal from signal control valve 164 against the new stroke end can be obtained by adjusting the valve rod assembly 166 as follows:

Step 1: screw push pipe 174 upward by the distance b to bring pipe base 178 to its new position Step 2: screw push rod 176 downward by the distance b.

At the end of step 2 pipe base 178 will be at its new position and rod base 180 will be back at its original position.

In order to adjust the valve rod assembly 166 to a new position of the upper adjustable cylinder head 122 only the push rod 176 has to be moved inside push pipe 174 to adjust rod base 180.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. A multi-component delivery apparatus comprising:
   piston pumps having preset displacement volumes,
   operating means coupled to each of said pumps,
   means for supplying component fluids to each of said pumps and,
   means for removing measured amounts of component fluids from each of said pumps,
   characterised in that the apparatus has:
   means for starting the strokes of each of the connected pumps at the same moment,
   means for assuring complete execution of each stroke in each pump before the beginning of any next stroke,
   means for controlling the speed of the pistons in each pump so that all pumps end their respective strokes at the same moment,
   means for modifying the stroke length of the pumps without causing pulsation,
   means for adjusting the position of stroke reversal to a modified stroke end position;
   wherein the operating means comprises piston motors being coupled to the piston pumps via their piston rods and having spacer means for adjusting the stroke length at one or at both ends of the pump cylinders characterised in that the spacer means consists of two plates which can be adjusted to any required distance from each other and which are sealed against the cylinder wall and against conduits traversing the spacer means thus creating a void cylinder area where virtually no actuation means is absorbed at the stroke beginning;
   said spacer means characterised in that one of the plates is represented by a cylinder top plate and the second plate is represented by an adjustable cylinder head which is sealed against the cylinder wall and against conduits and rods traversing the spacer means and which can be set to different stroke lengths from outside the cylinder without having to dismantle the motor.

2. A multi-component delivery apparatus comprising:
   piston pumps having preset displacement volumes,
   operating means coupled to each of said pumps,
   means for supplying component fluids to each of said pumps and,
   means for removing measured amounts or component fluids from each of said pumps,
   characterised in that the apparatus has:
   means for starting the strokes of each of the connected pumps at the same moment,
   means for assuring complete execution of each stroke in each pump before the beginning of any next stroke,
   means for controlling the speed of the pistons in each pump so that all pumps end their respective strokes at the same moment,
   means for modifying the stroke length of the pumps without causing pulsation,
   means for adjusting the position of stroke reversal to a modified stroke end position;
   wherein the operating means comprises piston motors being coupled to the piston pumps via their piston rods and where the stroke reversals of the motor at designated piston positions for both stroke directions are caused by a single valve rod at one end of the motor only characterised in that the valve rod can be adjusted to different stroke length by added members.

3. The apparatus of claim 2 wherein the valve rod comprises a push rod with rod base sliding inside a push pipe with pipe base so that the valve rod can be adjusted to different positions of stroke reversal from outside the motor without having to dismantle the motor.

4. A multi-component delivery apparatus comprising:
   piston pumps having preset displacement volumes,
   operating means coupled to each of said pumps,
   means for supplying component fluids to each of said pumps and,
   means for removing measured amounts of component fluids from each of said pumps,
   characterised in that the apparatus has:
   means for starting the strokes of each of the connected pumps at the same moment,
   means for assuring complete execution of each stroke in each pump before the beginning of any next stroke,
   means for controlling the speed of the pistons in each pump so that all pumps end their respective strokes at the same moment,
   means for modifying the stroke length of the pumps without causing pulsation,
   means for adjusting the position of stroke reversal to a modified stroke end position;
   wherein the operating means comprises piston motors having cylinder heads with mounted signal control valve/valve rod assembly characterised in that the cylinder head with mounted signal control valve/valve rod assembly is mechanically adjustable within the cylinder to different stroke end positions and thus allows to change the stroke length and to obtain signals at the new stroke end positions simultaneously without having to dismantle the motor.

5. A multi-component delivery apparatus comprising:
   piston pumps having preset displacement volumes,
   operating means coupled to each of said pumps,
   means for supplying component fluids to each of said pumps and,
   means for removing measured amounts of component fluids from each of said pumps,
   characterised in that the apparatus has:
   means for starting the strokes of each of the connected pumps at the same moment,
   means for assuring complete execution of each stroke in each pump before the beginning of any next stroke,
   means for controlling the speed of the pistons in each pump so that all pumps end their respective strokes at the same moment, means for modifying the stroke length of the pumps without causing pulsation, means for adjusting the position of stroke reversal to a modified stroke end position;

said apparatus further comprising:

transmitters connected to each motor which are actuated by the motor characterised in that they transmit signals to a logic circuit at the end of each stroke, and a speed control means which receives signals from each of the connected motors indicating the completion of a stroke and where one of the motors is designated as guide motor whilst the other motors are being considered as dependent motors characterised in that the speed control means processes the signals in such a way that outgoing signals are obtained when dependent motors finish their respective stroke at different moments than the guide motor and that in case of such deviations the outgoing signals indicate whether the dependent motors finish their stroke earlier or later.

6. An apparatus as defined in claim 5 further comprising restrictors connected to the supply or exhaust line of the actuation means of each motor characterised in that the restrictors are remote controlled by signals from a speed control means designating the sense and duration of actuation and setting the restrictors to such a position that all pumps finish their respective strokes simultaneously.

7. A multi-component delivery apparatus comprising: piston pumps having preset displacement volumes, operating means coupled to each of said pumps, means for supplying component fluids to each of said pumps and, means for removing measured amounts of component fluids from each of said pumps, characterised in that the apparatus has:

means for starting the strokes of each of the connected pumps at the same moment, means for assuring complete execution of each stroke in each pump before the beginning of any next stroke, means for controlling the speed of the pistons in each pump so that all pumps end their respective strokes at the same moment, means for modifying the stroke length of the pumps without causing pulsation, means for adjusting the position of stroke reversal to a modified stroke end position;

said apparatus further comprising:

transmitters connected to each motor which are actuated by the motor characterised in that they transmit signals to a logic circuit at the end of each stroke, and, a means for synchronously processing stroke position signals to emit a single output signal only after all input signals of end of stroke position of all pumps have been received by such means, said means being constructed and arranged to start all pumps through such output signal.

* * * * *